United States Patent Office 3,606,574
Patented Sept. 20, 1971

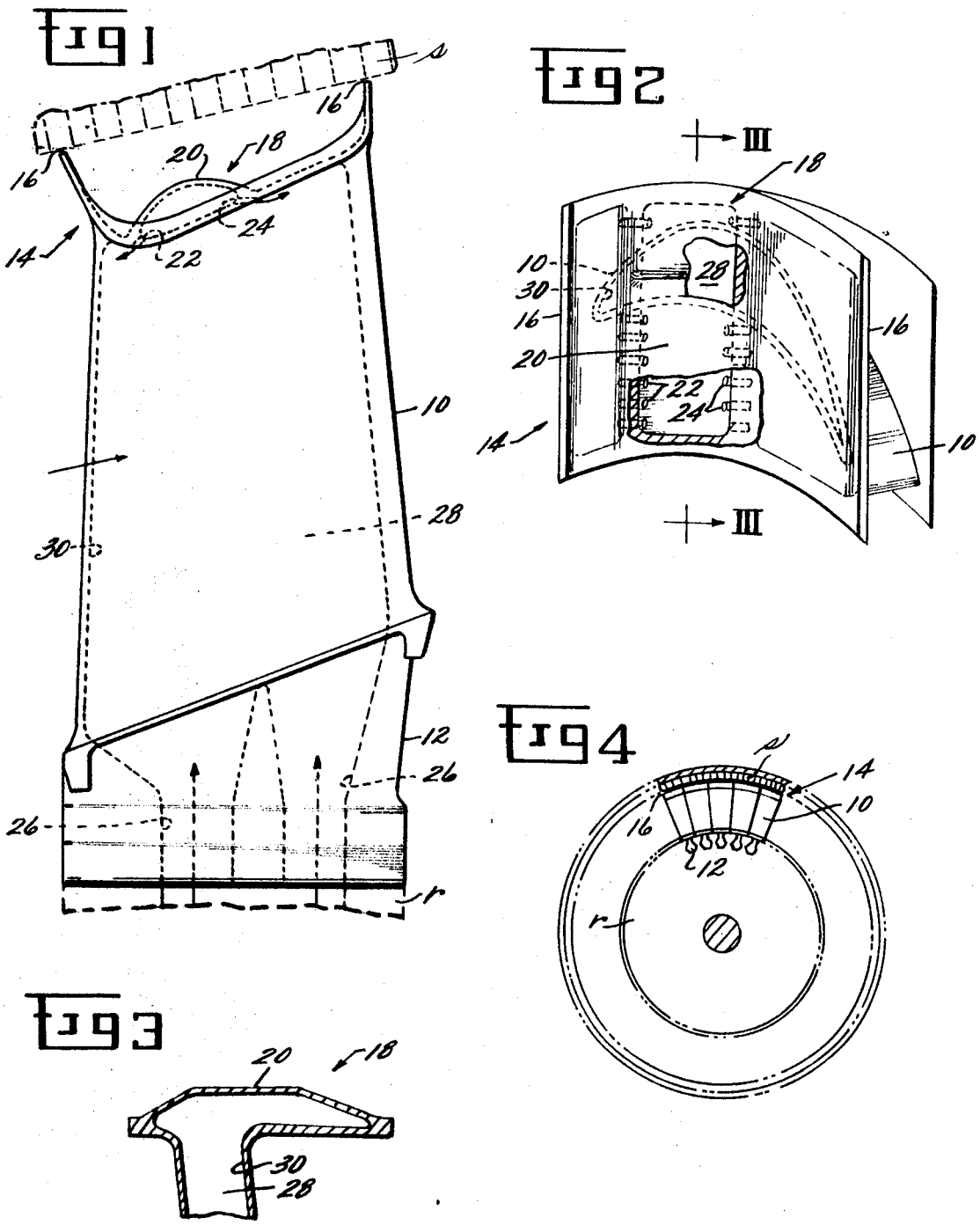

3,606,574
COOLED SHROUDED TURBINE BLADE
Henry J. Brands, Joseph W. Savage, and Frederick C. Herzner, Cincinnati, Ohio, assignors to General Electric Company
Filed Oct. 23, 1969, Ser. No. 868,785
Int. Cl. F01d 5/18
U.S. Cl. 416—96                                   2 Claims

ABSTRACT OF THE DISCLOSURE

A hollow turbine blade is provided with a circumferential shroud segment at its outer end. A circumferential plenum directs cooling fluid from the blade to holes which extend to the inner surface of the shroud segment to provide for cooling of the shroud. The plenum is of arched construction for maximum strength.

---

The present invention relates to improvements in axial flow turbines and, more particularly, to improvements in cooling turbine blades having tip shrouds. The invention herein described was made in the course of or under a contract, or a subcontract thereunder, with the United States Department of the Air Force.

As the operating temperatures of gas turbine engines have increased, there has been an ever-increasing use of cooling air, and other cooling fluids, to maintain the temperature levels of hot section components at acceptable levels. Use of these cooling techniques has been necessary to retain sufficient strength in structural elements as well as to prevent burning and/or melting of the metal components, particularly in the turbines of such engines.

The object of the present invention is to provide improved cooling techniques for turbine blades having tip shrouds and efficiently extend the use of such blades in hot gas streams having extremely high temperatures.

The outer bounds of the annular gas flow path may be defined by either a fixed shroud or a rotating shroud carried by the rotor blades. In the latter case, the shroud is usually formed by circumferential segments in the form of "wings" projecting from opposite sides of each turbine blade.

Tip shrouds provide the primary function of minimizing aerodynamic and thermal losses at the outer ends of the turbine blades. Additionally, in the case of high radius ratio (blade length/chord) blades, they serve to damp vibrations.

In accordance with the present invention, in its broader aspects, a turbine blade is provided with a circumferential cooling fluid plenum formed in a tip shroud segment. This plenum is supplied with cooling fluid from an internal cavity in the blade. Small holes discharge cooling air from the plenum to the inner surfaces of the shroud segment to provide a highly effective cooling action with a structure capable of operating in a highly stressed rotational environment. The plenum is preferably of an arched construction for maximum strength.

The above and other related objects and features of the invention will be apparent from a reading of the following description of the disclosure found in the accompanying drawing and the novelty thereof pointed out in the appended claims.

In the drawing:

FIG. 1 is a side view, partially in section, of a turbine blade embodying the present invention;

FIG. 2 is a top view, partially in section, of this blade;

FIG. 3 is a section taken on line III—III in FIG. 2; and

FIG. 4 is a small scale view of a tip shrouded turbine rotor assembly.

Referencing FIGS. 1–3, the illustrated blade comprises a cambered airfoil portion 10 having a circular arc tang 12 at its inner end to provide for mounting of the blade on a rotor $r$, illustrated in phantom. Relative relationships herein, such as radial and circumferential, are expressed in relation to the rotor axis as is common in this technology. A circumferential shroud segment 14 is formed at the outer end of the airfoil portion. This segment is disposed generally centrally of the cambered cross section of the airfoil portion. Outwardly projecting radial flanges 16 are provided at the upstream and downstream ends of the segment 14.

FIG. 4 illustrates a turbine rotor assembly of blades as thus far described. The segments 14 are in contiguous relationship to compositely form a shroud or hoop, the inner surface of which defines the outer bounds of the annular, hot gas flow path through the turbine blades. The flanges 16 compositely form circumferential sealing teeth which cooperate with stationary shrouds $s$ to form a gas seal (FIG. 1).

Reverting back to FIGS. 1–3, a plenum 18 is provided circumferentially of the segment 14. The plenum is formed by a thin wall 20 which is gently arched, in both an axial and circumferential direction, away from the thin wall of the segment. Two rows of holes 22, 24 are provided. These holes, or passageways, are spaced apart from the plenum 18 to the inner surface of the segment 14.

Passageway means are provided for supplying cooling air from the inner end of the blade to the plenum 18. These means include holes 26 formed radially in the tang 12. When the blade is mounted in the rotor, these holes are connected to a source of pressurized cooling fluid. The cooling air passes into a hole cavity 28 defined by the thin shell 30 of the airfoil portion 10 which, in turn, opens into the plenum 18. Holes may be provided in the shell 30 to facilitate cooling of this shell.

The cooling fluid passes through the plenum 18 and holes 22, 24 to the inner surface of the segment 14. This flow of cooling fluid cools the segment, both by convection and by supplying a thin film of cooling fluid to the inner surface of the segment to insulate it from the hot gas stream. In this latter connection it is preferable that the holes 22 and 24 be formed at a low angle relative to the inner surface of the segment.

It is contemplated that more than one plenum could be provided on the segment. However, it is preferred that a plenum be disposed adjacent the upstream end of the segment. Additional cooling fluid may also be directed toward the shroud from stationary engine structure upstream thereof.

The described tip shroud cooling structure is highly effective in minimizing the metal temperature of that portion of the blade. Further, the arched construction of the plenum 18 is significant in minimizing blade weight while providing the capability of operating in the high stress environment of a rapidly rotating turbine wheel.

Having thus described the invention, what is claimed as novel and desired to be secured by Letters Patent of the United States is:

1. A shrouded turbine blade comprising
   a cambered airfoil section
   a tang, at the inner end of the airfoil section, for attaching the blade to a rotor,
   a passageway extending through the blade end having an entrance at its inner end for connection with a source of pressurized cooling fluid.
   a circumferentially shrouded segment integrally formed with the airfoil section at its outer end, the inner surface of the segment defining the outer bounds of the gas flow path past the blade when it is installed on a turbine rotor, said segment being of thin walled construction extending circumferentially on opposite sides of the airfoil section and terminating in radially extending, circumferential sealing flange portions at the leading and trailing edges of the airfoil section, a circumferential plenum of limited axial length into which the airfoil passageway opens, said plenum defined by a thin wall gently arched from the outer surface of the segment wall in both an axial and circumferential sense, said plenum being adjacent the leading edge of the airfoil section and having a radial height less than that of the sealing flange portions and a plurality of relatively small passageways extending from said plenum to the inner surface of the segment wall and disposed at a relatively low angle to the inner surface of said segment wall.

2. A shrouded turbine blade as in claim 1 wherein the passageways are disposed in two circumferential rows at the upstream and downstream sides of the plenum with the upstream passageways being angled upstream and the downstream passageways being angled downstream.

References Cited
UNITED STATES PATENTS

| | | | |
|---|---|---|---|
| 3,182,955 | 5/1965 | Hyde | 416—191X |
| 3,191,908 | 6/1965 | Powell et al. | 416—96 |
| 3,290,004 | 12/1966 | Ishibashi | 416—190X |
| 3,302,924 | 2/1967 | Castle | 416—96 |
| 3,527,544 | 9/1970 | Allen | 416—90 |

EVERETTE A. POWELL, JR., Primary Examiner

U.S. Cl. X.R.

416—97, 191, 192